United States Patent [19]

Franke

[11] 4,053,778

[45] Oct. 11, 1977

[54] TRANSPORTABLE X-RAY DIAGNOSTIC APPARATUS

[75] Inventor: Kurt Franke, Erlangen, Germany

[73] Assignee: Siemens Aktiengesellschaft, Berlin & Munich, Germany

[21] Appl. No.: 624,167

[22] Filed: Oct. 20, 1975

[30] Foreign Application Priority Data

Oct. 23, 1974 Germany .............................. 2450388

[51] Int. Cl.² .............................................. H05G 1/00
[52] U.S. Cl. ..................................... 250/402; 250/408
[58] Field of Search ............... 250/401, 402, 408, 409, 250/413, 414, 416

[56] References Cited

U.S. PATENT DOCUMENTS 3,125,679  3/1964  Ohde ................................... 250/418
3,348,051  10/1967  Weighart .............................. 250/409
3,790,805  2/1974  Toderaro ............................. 250/522
3,828,194  8/1974  Grasser ............................... 250/402

Primary Examiner—Craig E. Church
Attorney, Agent, or Firm—Hill, Gross, Simpson, Van Santen, Steadman, Chiara & Simpson

[57] ABSTRACT

A transportable X-ray diagnostic generator, in effect an X-ray diagnostic generator which can be transported without an interfering cable after charging of the condenser and in which the weight is maintained as low as possible. For the charging of the high-voltage condenser and for the supply of the filament transformer, a DC/AC converter or inverted converter is connected to the primary windings of the high-voltage transformer and to the filament transformer, and which has a storage cell connected ahead or at the input thereof.

1 Claim, 1 Drawing Figure

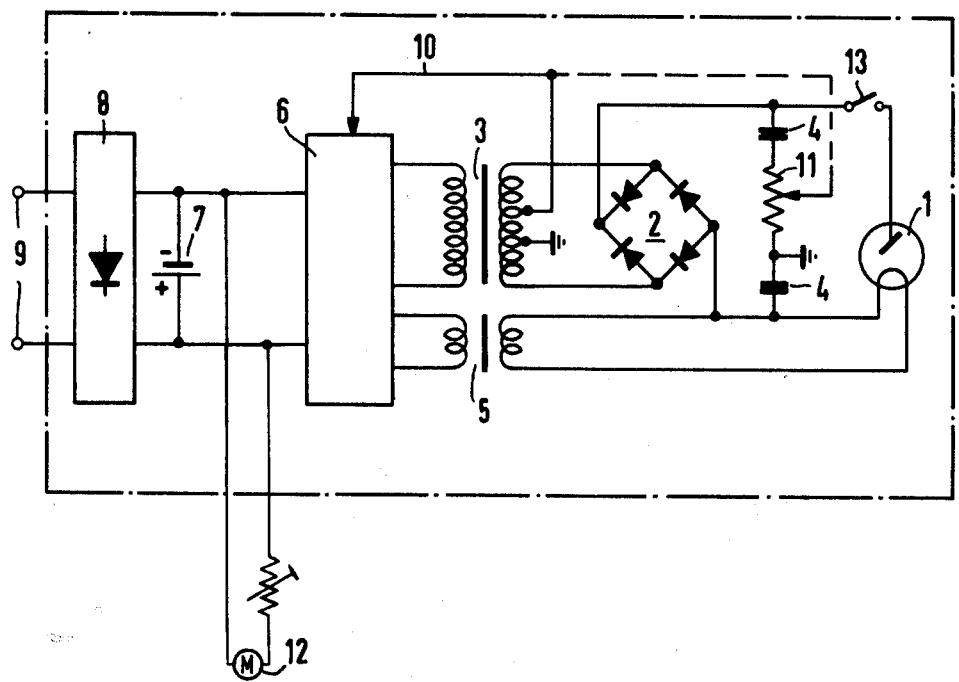

TRANSPORTABLE X-RAY DIAGNOSTIC APPARATUS

FIELD OF THE INVENTION

The present invention relates to a transportable X-ray diagnostic apparatus.

DISCUSSION OF THE PRIOR ART

An X-ray diagnostic apparatus is known in which, connected in parallel to an X-ray tube, is high-voltage condenser consisting of two elements, and which is charged from a power supply through a high-voltage rectifier. For effecting the preparation of an X-ray exposure, in this X-ray diagnostic apparatus the energy is at first withdrawn from the condenser and, after the discharge thereof, there follows the power supplying of the X-ray tube of means of a continually operative current source, namely, a high-voltage transformer with an after-connected rectifier. The condenser provides the advantage that, for the preparation of exposures of short duration, the power supply is only burdened very little, so that the power supply voltage dropoff is extremely small at such short-term exposures.

In principle it is possible to construct a condenser apparatus so as to be also transportable, charge at power supply, and then to convey it to the exposure location. It is also possible to arrange a condenser apparatus on a mobile carriage or wagon so that the apparatus is rendered suitable for the preparation of X-ray exposures at a hospital or sick bed. Such a portable or mobile condenser apparatus has the advantage that it may be conveyed to a suitable location after charging thereof, without the interference of a cable. However, it is disadvantageous that the weight of the apparatus is extremely high due to the required necessarily high storage capacity of the high-voltage condenser.

SUMMARY OF THE INVENTION

Accordingly, it is an object of the present invention to provide a transportable X-ray diagnostic generator of the above-mentioned type, in effect an X-ray diagnostic generator which can be transported without an interferring cable after charging of the condenser and in which the weight is maintained as low as possible.

The foregoing object is inventively attained in that, for the charging of the high-voltage condenser and for the supply of the filament transformer, a DC/AC converter or inverted converter is connected to the primary windings of the high-voltage transformer and to the filament transformer, and which has a storage cell connected ahead or at the input thereof. The invention is predicated on the knowledge that a minimum weight can be achieved when two storage units are provided in the generator, namely, a relatively small high-voltage condenser and a similarly not too large storage cell or battery, on the primary side of the high-voltage transformer.

A further reduction in weight is possible when the power supply of the high-voltage transformer is carried out at a higher frequency than the power supply frequency, preferably of a magnitude in the range between 1000 and 2000 Hz.

BRIEF DESCRIPTION OF THE DRAWING

Further advantages and details of the invention may now be ascertained from the following description of an exemplary embodiment thereof, taken in conjunction with the single FIGURE of the drawing showing a schematic circuit diagram of the invention.

DETAILED DESCRIPTION

In the drawing there is illustrated the circuit diagram of a mobile X-ray diagnostic generator constructed pursuant to the invention. The construction elements which are illustrated within the phantom-lined box form the generator and are arranged on a mobile undercarriage. An X-ray tube 1 is supplied from a high-voltage rectifier 2 which is connected to the output of a high-voltage transformer 3. Located in parallel connection with the high-voltage rectifier 2 and to the X-ray tube 1 are two high-voltage condenser elements 4. The supplying of the high-voltage transformer 3 and the filament transformer 5 is carried out through an inverted converted or DC/AC converter 6 which is connected to a storage cell 7. A charging apparatus 8 is connected to the input of the storage cell 7, which consists of a power supply transformer and an after-connected rectifier. The inputs of the charging apparatus 8 are conducted to a terminal plug arrangement 9.

For regulating the voltage or the condenser 7, a voltage is branched off at the secondary winding of the high-voltage transformer 3, which is transmitted through the conduit 10 to the DC/AC converter 6 as an actual value. This voltage, as is indicated in chain-dotted illustration, may also be branched or tapped off from a resistor 11 which is arranged in series connection with one of the condenser elements. The DC/AC converter 6, which may be a chopper, possesses means for the setting of its output voltage which is a component of a control circuit for the condenser voltage. This control circuit, as previously mentioned, contains as the actual value indicator the secondary winding of the high-voltage transformer 3, respectively, the resistor 11.

The accumulator or storage cell 7 is charged from the power supply during the operating pauses. When an exposure is to be prepared at a hospital or sick bed, the X-ray diagnostic generator is then transported to the patient, and wherein there will be no interference from any cable. For effecting the initiation of an exposure, the inverted converter 6 is placed into operation so as to charge the condenser 4 and heat the X-ray tube 1. When a predetermined condenser voltage has been reached, the switch 13 is then closed and the X-ray tube 1 generates X-rays, whereupon the condenser 4 discharges. When the condenser voltage has dropped down to a predetermined value, then through the conduit 10 there will be effected that the DC/AC converter 6 correspondingly aftercharges, meaning, will effect the continued supply of the X-ray tube 1.

For short-term exposures, the energy stored in the condenser 4 will in general be adequate whereas, for longer term exposures, energy is delivered from the storage cell 7 through the DC/AC converter 6. In the inventive X-ray diagnostic generator there is thus no need to store energy in the high-voltage condenser also required for lengthy exposures. The construction elements 4 and 7 may be so dimensioned as to achieve an optimum generator weight.

From the drawing it may be ascertained that the accumulator or storage cell 7 also supplies power to a drive motor 12 which serves for driving the mobile undercarriage of the X-ray diagnostic generator. The inventive X-ray diagnostic generator thus has the advantage that the supportive mobile undercarriage can be motor-driven without the necessity of requiring a cable.

It is to be understood that in connection with high-voltage condenser within the context of the present invention, according to the drawing this relates not only to a single condenser but also to a condenser battery which consists of a plurality of individual condensers.

The actuation of the X-ray tube may also be carried out by means of a control grid, within the scope of the invention.

The output frequency of the DC/AC converter 6 lies between 1000 and 2000 Hz, so that the high-voltage transformer 3 may be constructed small and of lightweight.

While there has been shown what is considered to be the preferred embodiment of the invention, it will be obvious that modifications may be made which come within the scope of the disclosure of the specification.

What is claimed is:

1. In a transportable X-ray diagnostic generator including an X-ray tube; a high-voltage rectifier; a high-voltage condenser connected in parallel with said X-ray tube and high-voltage rectifier; a high-voltage transformer; and a filament transformer; an inverted converter being connected to the primary windings of said high-voltage transformer and filament transformer for charging said high-voltage condenser and supplying said filament transformer; and storage cell means being connected to the input of said inverted converter; the energy for an X-ray exposure being stored partially in said storage cell means and partially in said high-voltage condenser; said generator further including charging apparatus connected to said storage cell means and having inputs connected to a terminal plug arrangement; said converter having an output voltage of a frequency higher than the frequency of the power supply, the output frequency of said converter being between 1,000 and 2,000 Hz; means for adjusting the output voltage of said converter and comprising a variable resistor, said high voltage condenser comprising two condenser elements, said variable resistor being connected between said two condenser elements, a mobile carriage mounting the generator components; and a motor connected to said storage cell means for driving said mobile carriage, said storage cell means storing partially the energy for an X-ray exposure and providing energy for driving said carriage by said motor.

* * * * *